United States Patent
Huang et al.

(10) Patent No.: US 6,301,293 B1
(45) Date of Patent: Oct. 9, 2001

(54) DETECTORS FOR CDMA SYSTEMS

(75) Inventors: Howard C. Huang, Hoboken; Constantinos Basil Papadias, Madison; Laurence Eugene Mailaender, Hoboken, all of NJ (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/129,479

(22) Filed: Aug. 4, 1998

(51) Int. Cl.[7] ............................. H04K 1/00; H04L 27/30
(52) U.S. Cl. ........................... 375/206; 375/142; 375/342
(58) Field of Search ............................ 375/206, 347, 375/142; 455/561

(56) References Cited

U.S. PATENT DOCUMENTS

| | | | |
|---|---|---|---|
| 5,838,742 | * 11/1998 | Abu-Dayya | 375/347 |
| 6,006,110 | * 12/1999 | Raleigh | 455/561 |
| 6,069,912 | * 5/2000 | Sawahashi et al. | 375/142 |
| 6,097,773 | * 8/2000 | Carter et al. | 375/347 |

OTHER PUBLICATIONS

Howard C. Huang, and Stuart C. schartz, A comparative Analysis of Liner Multiuser Detectors for Fadind Multipath Channels, IEEE 1994, pp. 11–15.*

Adaptive Detection for DS–CDMA, Graeme Woodward, and Branka S. Vucetic, IEEE, vol. 86, No. 7, Jul. 1998, pp. 1413–1434.*

Multi–User Detection for DS–CDMA Communicatios, Shimon Moshavi, Bellcore, IEEE 1996, pp. 124–136..*

Low Complexity asynchronous DS–CDMA Detectors, Thomas Ostman, Bjorn Ottersten, IEEE 1996, pp. 559–563.*

Nagatsuka, M.; Kohno, R.; "A Spatially and Temporally Optimal Multi–User Receiver Using an Array Antena for DS/CDMA", *IEICE Trans. Commun.*, vol. E78–B, No. 11 Nov. 1995.

Miller, S; Schwartz, S.; "Integrated Spatial–Temporal Detectors for Asynchronous Gaussian Multiple–Access Channels", *IEEE Trans on Communications*, vol. 43, No. 2/3/4. Feb. Mar. 2995, pp396–411.

Verdu, S.; "Multiuser Detection", *Advances in Statistical Signal Processing*, vol. 2, pp. 369–409, 1993.

Paulraj, A.; Papadias, C.; "Space–Time Processing for Wireless Communications", *IEEE Signal Processing Magazine*, Nov. 1997, pp. 49–83.

Naguib, A.; Paulraj, A.; "Performance of Wireless CDMA with M–ary Orthogonal Modulation and Cell Site Antenna Arrays", *IEEE Journal on Selected Areas in Comm.*, vol. 14, No. 9, Dec. 1996, pp. 1770–1783.

Price, R.; Green, P. Jr.; "A Communicatin Technique for Multipath Channels", Proc. IRE, vol. 46, pp. 555–570, Mar. 1958.

Munoz, O.; Fernandez–Rubio, J.; "Cancellation of external and multiple access interference in CDMA systems using antenna arrays", *Signal Processing*, vol. 61, No. 2, pp. 113–129, 1997.

\* cited by examiner

*Primary Examiner*—Stephen Chin
*Assistant Examiner*—Tony Al-Beshrawi

(57) ABSTRACT

Linear space-time multiuser detectors are described that combine array processing, rake detection, and multiuser detection and that satisfy a minimum mean-squared error criteria. Both embodiments can be implemented adaptively so as to account for unknown sources of interference. The adaptive implementation of the first embodiment of a linear space-time detector requires explicit estimates of the channel coefficients. On the other hand, the adaptive implementation of the second embodiment does not require these estimates since they can be adaptively obtained. Both of these detectors provide significant performance advantages over single-user space-time detectors and over multiuser detectors which do not account for CDMA interference from unknown sources.

24 Claims, 8 Drawing Sheets

DETECTORS FOR CDMA SYSTEMS

FIELD OF THE INVENTION

This invention relates generally to direct sequence (DS) code division multiplex access (CDMA) systems subjected to multipath fading and multiple access interference (MAI), and more particularly to signal detection techniques for use in such systems.

BACKGROUND OF THE INVENTION

In wireless CDMA systems such as those proposed for next generation mobile wireless standards, the major impediments at the physical layer are multipath fading and multiple access interference caused by co-channel users which are not orthogonal to the desired user. The rake receiver, described in R. Price and P. E. Green, "A Communication Technique for Multipath Channels," Proceedings of the IRE, Vol. 46, pp. 555–570, March 1958, attempts to combat multipath fading by coherently combining resolvable multipath replicas of the desired signal. Multiuser detection described in S. Verdú, "Multiuser Detection," Cambridge University Press, New York, 1998, addresses the problem of MAI by actively accounting for its presence when detecting the desired user.

More recently, there has been growing interest in using array processing for further improving receiver performance. These techniques have focused on using multiple antennas at the base station receiver to provide antenna gain and/or diversity gain and allow the possibility of spatial processing. By combining these space-domain techniques with time domain techniques like rake detection and multiuser detection, the resulting space-time detectors show promise of improving the capacity of CDMA systems as compared to traditional time-domain-only detectors. See, for example, A. Paulraj and C. Papadias, "Space-Time Processing for Wireless Communications," IEEE Signal Processing Magazine, Vol. 14, No. 6, pp. 49–83, November 1997. The first generation of space-time CDMA detectors used array processing with either rake detection or multi-user detection. See, respectively, A. Naguib and A. Paulraj, "Performance of Wireless CDMA with M-ary Orthogonal Modulation and Cell Site Antenna Arrays," IEEE Journal on Selected Areas in Communications, Vol. 14, No. 9, pp. 1770–1783, December 1996 or S. Miller and S. Schwartz, "Integrated Spatial-Temporal Detectors for Asynchronous Gaussian Multiple-Access Channels," IEEE Transactions on Communications, Vol. 43, No. 2/3/4, pp. 396–411, February/March/April 1995. Later space-time CDMA detectors combined all three processing techniques. See: H. Huang; S. Schwartz, S. Verdú, "Combined Multipath and Spatial Resolution for Multiuser Detection: Potentials and Problems," Proceedings of the IEEE International Symposium on Information Theory, p. 380, 1995; or M. Nagatsuka and R. Kohno, "A Spatially and Temporally Optimal Multi-User Receiver Using an Array Antenna for DS/CDMA," IEICE Transactions on Communications, Vol. E78-B, No. 11, pp. 1489–1497, November 1995.

While the foregoing systems operate satisfactorily, improvements can be made, in particular to the space-time detectors which combine all three processing techniques. While the detector in the Nagatsuka and Kohno paper is optimum in the maximum likelihood sense, its computational complexity is exponential with respect to the number of users. Hence it is too complex to implement for practical systems. In the paper by Huang, Schwartz and Verdú, a tradeoff between performance and complexity is made, but this detector was not implemented adaptively since it used a zero-forcing criteria. Adaptive implementations allow receivers to account for unknown sources of interference thus improving the detector performance and increasing the system capacity. For example, a base station receiver could account for interference from adjacent cells or from an embedded microcell, while a handset receiver could account for interference from signals it is not explicitly demodulating.

SUMMARY OF THE INVENTION

This invention detects DS-CDMA signals utilizing a rake receiver, array processing, and multiuser detection. When combined with array processing, the rake receiver is often called a space-time rake receiver. The invention uses a minimum mean-squared error (MMSE) criterion in the multiuser detector. This criterion allows for relatively simple implementation in the form of a linear detector and also allows for adaptive implementation. Adaptive implementations are useful in practical situations where there is limited knowledge of the various received signals. As discussed above, both uplink and downlink capacity can be improved using adaptive detectors which account for unknown interference.

For pulse amplitude modulated (PAM) data signals, two embodiments of the invention provide options for trading off between performance and adaptive implementation complexity. The first embodiment performs better if there is perfect knowledge of the users' signal parameters. On the other hand, it requires more explicit channel information for adaptive implementation. Suppose the receiver consists of $P \geq 1$ antennas and the received signal consists of K DS-CDMA data signals, each with L delayed/weighted multipath replicas. At each antenna, a bank of filters is matched to the KL spreading codes with their multipath timing delays. The filter outputs are weighted according to the complex conjugate of the estimated channel (multipath and array) parameters and combined to form a K-vector where each component corresponds to one of the K codes. The real part of each component is taken. Estimates of the multipath delays and channel parameters may be obtained, for example, from a training or pilot signal. The conventional space-time rake receiver would pass each vector component to a decision device for estimating the corresponding user's PAM data symbol. However, unless the users' signals are orthogonal in the space-time domain, the vector components are contaminated with multiaccess interference from the other users. This invention proposes the use of a linear combiner prior to the decision devices to suppress the multiaccess interference. This linear combiner is represented by a real K-by-K matrix $W_A$ which multiplies the real K-vector. The matrix minimizes the mean squared error between its product with the real K-vector and the K-vector of data symbols. Because the matrix uses the minimum mean-squared error (MMSE) criterion, well-known adaptive algorithms can be used to adaptively obtain it. Each component of the final K-vector output corresponds to one of the K codes and is passed to either a decision slicer or a decoder for further processing.

The second embodiment has marginally inferior performance when the channel parameters are known exactly. However, under practical conditions of channel mismatch, the second embodiment often performs better. In terms of adaptive implementation, this embodiment requires less information (it does not require explicit channel estimates) but may be slower to adapt. As with the first embodiment, the front end of the second embodiment consists again of a bank of KL matched filters for each of the P antennas followed by weighting and combining. However, unlike the first embodiment, the order of the real operator and linear combiner (K-by-K matrix multiplication) are exchanged. In doing so, the weighting, combining, and linear combiner can be represented by a single complex K-by-KLP matrix $W_B$. The real parts of the components in the resulting K-vector are passed to either a decision device or a decoder for further processing. In the adaptive implementation, adaptive algorithms can be used to obtain the matrix $W_B$; hence channel estimates are not explicitly required.

For quadrature PAM (QAM) data signals, real operators are not required in the detector since the signal constellation is two-dimensional. In this case, a variation on the second embodiment would be used which does not use the real operators but follows the linear combiner directly with the appropriate decision device or decoder.

While the MMSE detection techniques are powerful in and of themselves, their performance can be further enhanced by using them with other multiuser detection techniques such as interference cancellation where interference, instead of being projected away as is done with linear multiuser detectors, is explicitly subtracted from the received signal. Interference cancellation can occur prior to or after the MMSE linear combiner.

Both embodiments of the MMSE detector can be generalized for practical systems which utilize, in addition to the data bearing channels, supplemental channels which may serve as pilot signals. Also, the MMSE detectors can operate in systems where signals are transmitted with different spreading factors.

A CDMA signal detector in accordance with the invention can provide significantly improved performance relative to a conventional signal detector which does not use multiuser detection or which does use multiuser detection but does not adaptively mitigate unknown interference.

BRIEF DESCRIPTION OF THE DRAWINGS

The foregoing and other features of the invention may become more apparent when the ensuing description is read together with the drawings, in which.

GENERAL DESCRIPTION

Figure 1:
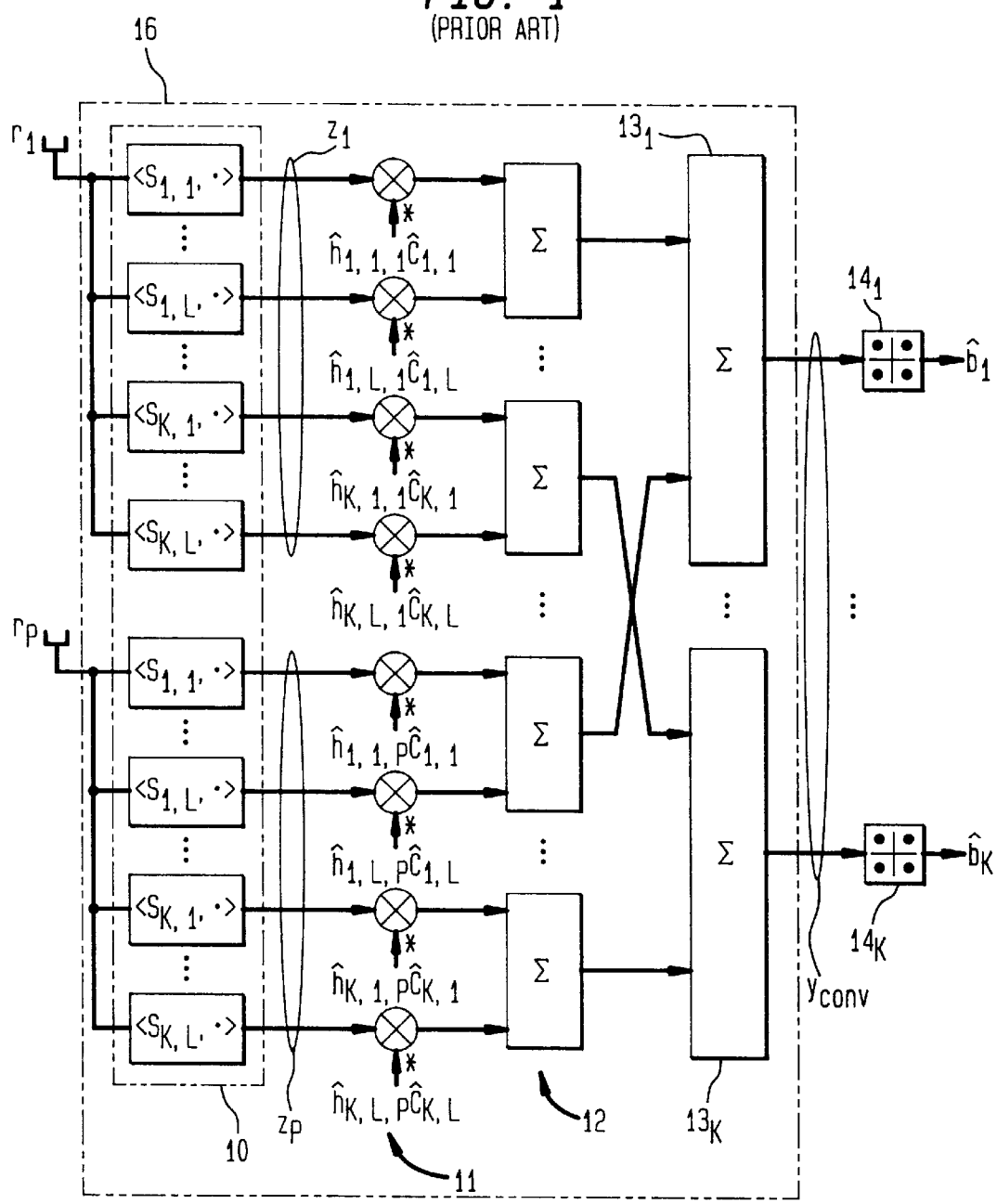
FIG. 1 shows a prior art single-user space-time rake receiver employing a multi-element antenna array, a bank of N-chip filters at each antenna, and a channel weighter and combiner.

Consider a K user system where the kth user (k=1 ... K) modulates its data sequence $b_k(t)$ with an N-chip spreading sequences $s_k(t)$. For Detector A, the data sequence is pulse amplitude modulated (PAM); for Detector B, the data sequence can be either PAM or quadrature PAM (QAM). The transmitted signal undergoes frequency-selective fading in the channel and arrives at the receiver as L time-resolvable multipath components with complex fading channel coefficients $c_{k,1}(t) \ldots c_{k,L}(t)$. Assume that the receiver is a P-element linear array. If each resolvable multipath component arrives as a planar wavefront with angle $\theta_{k,l}(t)$ with respect to a linear array and if the array spacing is sufficiently close (e.g., $\lambda/2$) so that there is perfect correlation among array elements for a given wavefront, then the phase offset of the pth element, with respect to the first is $h_{k,l,p}(t) = \exp[[\pi(p-1) \sin \theta_{k,l}(t)]]$. The received signal at the pth antenna for given symbol period (and ignoring intersymbol interference) is:

$$r_p(t) = \sum_{k=1}^{K} \sum_{l=1}^{L} h_{k,l,p}(t) c_{k,l}(t) s_k(t - \tau_{k,l}) A_k b(t - \tau_{k,l}) + n_p(t) \quad (1)$$

where $A_k$ is the amplitude for user k, $\tau_{k,l}$ is the delay for the kth user's lth multipath, and $n_p(t)$ is the additive Gaussian noise process which accounts for out-of-cell interference and background noise. We now make the following assumptions to simplify the analysis.

1. The signals are received bit synchronously.
2. The time spread is small compared to the symbol period so that intersymbol interference can be ignored.
3. The phase offsets and channel coefficients are constant over a symbol period.

The first assumption will be dropped later. Under these assumptions, the chip matched-filter output for the received signal in equation (1) is a complex N-vector $$r_p = \sum_{k=1}^{K} \sum_{l=1}^{L} h_{k,l,p} c_{k,l} s_{k,l} A_k b_k + n_p$$

where $s_{k,l}$ is the chip matched-filter N-vector corresponding to $s_k(t-\tau_{k,l})$ and $n_p$ is the complex N-vector corresponding to the Gaussian noise. The spreading codes are normalized to have unit energy: $\|s_{k,l}\|=1$. The spreading codes are assumed to be random. However, adaptive implementations of these MMSE detectors require the use of short spreading codes which repeat after a few symbol periods. The following notation will be used hereinafter:

| | |
|---|---|
| $h_{k,l} = [h_{k,j} \ldots h_{k,l,P}]^T$ | complex P-vector of array coefficients |
| $H = [h_{1,1} \ldots h_{1,L} \ldots h_{k,1} \ldots h_{K,L}]$ | complex P × KL array matrix |
| $H^D = \text{diag}(h_{1,1} \ldots H_{1,L} \ldots h_{K,1} \ldots h_{K,L})$ | complex KLP × KL array matrix |
| $c_k = [c_{k,1} \ldots c_{k,L}]^T$ | complex L-vector of channel coeffic'ts |
| $C = \text{diag}(c_1 \ldots c_K)$ | complex KL × K channel matrix |
| $R$ | complex KL × KL correlation matrix defined by $R_{((k1-1)K+l1,(k2-1)K+l2)}$ $= s^H_{k1,l1} s_{k2,l2}$ |
| $A = \text{diag}(A_1 \ldots A_K)$ | real K × K amplitude matrix |
| $b = [b_1 \ldots b_K]^T$ | real K-vector of data bits |
| $I_u$ | u × u identity matrix |
| $1_u$ | u-vector of ones |
| $0_{u \times u}$ | u × u matrix of zeros |
| $0_u$ | u-vector of zeros |

The corresponding estimated values for the array and channel coefficients will be represented with the symbol "^" over the symbol for the value. The noise vector is a zero-mean complex Gaussian vector whose distribution can be written in terms of its (component-wise) real and imaginary components:

$$\begin{bmatrix} Re(n) \\ Im(n) \end{bmatrix} \sim \eta\left(\begin{bmatrix} 0_N \\ 0_N \end{bmatrix}, \sigma^2 \begin{bmatrix} I_N & 0_{NxN} \\ 0_{NxN} & I_N \end{bmatrix}\right).$$

where we define the real and imaginary operations for matrices and vectors as $Re(X)=(X+X^*)/2$ and $Im(X)=(X-X^*)/2$ where * denotes the complex conjugate. Hence $Re(n)$ and $Im(n)$ are zero-mean Gaussian random vectors whose components have variance $\sigma^2$ and are mutually uncorrelated.

Conventional (Space-Time Rake) Receiver, (FIG. 1)

In the context of this array-multipath channel, the prior art single user detector is a correlator matched to the desired user's composite array-multipath-spreading code signal. This detector does not account for the presence of interferers; however, it is the maximum-likelihood detector if there are no interferers or if they are orthogonal to the desired user in array-code space. As shown in FIG. 1, the detector consists of a bank of correlators 10 at each antenna, matched to the KL multipath spreading codes $s_{1,1} \ldots s_{1,L} \ldots s_{K,1} \ldots s_{K,L}$. The notation $<s_{k,l},\cdot>$ in the left-most boxes of FIG. 1 indicates taking the inner product between $s_{k,l}$ (the kth user's spreading code corresponding to the lth multipath delay) and the input vector to the box. The dot in the notation $<s_{k,l},\cdot>$ represents the input. The timing estimates are obtained using a separate timing estimation algorithm. The output of the upper left-hand box (which corresponds to the first component of the vector $z_l$) is $<s_{1,1}^H, r_1> = s_{1,1}^H r_1$ where the H superscript signifies the Hermitian transpose (take the complex conjugate of each element, then take the transpose of the resulting vector) of a complex vector. The matched filter outputs for at least a subset of the multiple signals, a plurality of the multipath components of these signals, and a plurality of receiver antennas are indicated in the drawing at $(z_1 \ldots z_P)$ At reference number 11, the correlator outputs are weighted by the complex conjugate of their corresponding channel estimate. More specifically, the correlator output at the pth antenna for the lth multipath of user k is weighted by the complex conjugate of the estimate of the corresponding channel (array/multipath) coefficient $\hat{h}_{k,l,p}\hat{c}_{hd\ k,l}$. These estimates are obtained using a separate channel estimation algorithm. At each antenna, the L components for the kth user are added 12), and then the resulting P components for the kth user are added $13_k$ (k=1 ... K). Each component is then passed to either a decision device or a decoder. For PAM data signals, the decision device for the kth user $14_k$, k=1 ... K) gives as its output the symbol which is closest in the Euclidean distance sense to the real part of a kth vector component. For QAM data signals, the real operator is not required.

From FIG. 1, the KLP-vector $z=[z_1^T \ldots z_P^T]^T$ at the output of the matched filters can be written as:

$$z=\tilde{R}H^D CAb + n^s \quad (2)$$

where we define the KLP×KLP block-toeplitz matrix $\tilde{R}=R \otimes I_{pP}$ and $H^D$ represents the KLP×KL matrix, $\otimes$ denotes the Kronecker product operation between two matrices, and $n^S$ denotes the complex noise vector is a complex Gaussian random vector with distribution $$\begin{bmatrix} Re(n^s) \\ Im(n^s) \end{bmatrix} \sim \eta\left(\begin{bmatrix} 0_N \\ 0_N \end{bmatrix}, \sigma^2 \begin{bmatrix} Re(\tilde{R}) & Im(\tilde{R}) \\ -Im(\tilde{R}) & Re(\tilde{R}) \end{bmatrix}\right)$$

Using the fact that $(\hat{H}^D\hat{C})^H \tilde{R} H^D C = \hat{C}^H[(\hat{H}^H H) \circ R]C$ (where $\circ$ denotes the component-wise product between two same-sized matrices), the K vector at the output of the channel combiners and the input to the decision devices $14_1$–$14_K$ can be concisely written as:

$$Re\{y_{conv}\} = Re\{(\hat{H}^D\hat{C})^H z\} MAb + n_{conv} \quad (3)$$

where H denotes the complex conjugate transpose, $\circ$ represents the component-wise product of two same-sized matrices, and $M = Re\{\hat{C}^H[(\hat{H}^H) \circ R]C\}$. The noise vector is purely real and has distribution:

$$n_{conv} \sim \eta(0_n, \sigma^2 \hat{M}).$$

where $\hat{M} = \hat{C}^H[(\hat{H}^H \hat{H}) \circ R]\hat{C}$. If the data is BPSK modulated, the bit decision for user k is simply the hard limit of the kth component of $Re\{y_{conv}\}$: $\hat{b}_k = sgn(Re\{y_{conv,k}\})$. The corresponding bit error rate $P_k^{conv}$ of the conventional rake receiver is:

$$P_k^{conv}(\sigma) = Q\left[\frac{(MAb)_k}{\sigma\sqrt{\hat{M}_{(k,k)}}}\right] \quad (4)$$

where $X_{(k,k)}$ is the (k,k)th element of matrix X. The performance comparisons among the various detectors are given in terms of BPSK modulated data, but they can also be done for any QAM modulated data in general.

Figure 2:
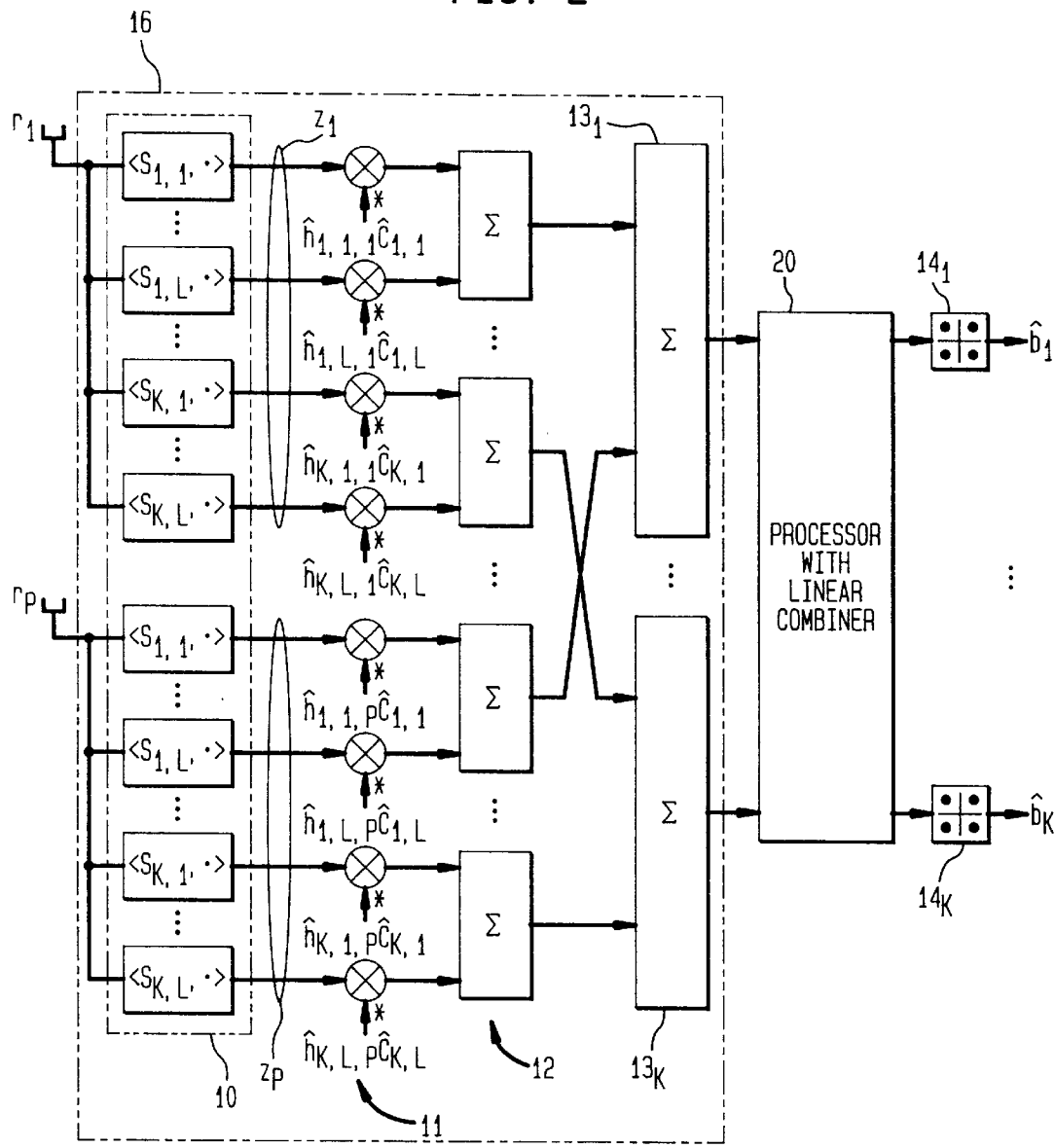
FIG. 2 shows the generic embodiment of the invention.

Generic Space-Time Linear Multiuser Rake Receiver (FIG. 2)

The prior art space-time rake receiver described above is a single user receiver in the sense that for a given user, the demodulation uses information only from that user. Since it does not account for the presence of interference from other users, its performance suffers. FIG. 2 shows a generic multiuser space-time rake receiver. It accounts for the multiaccess interference using a linear combiner. Two versions of this detector are given. The first, known as detector A, uses the real operators before the linear combiner. In this case, reference 20 in FIG. 2 consists of a bank of real operators followed by a linear combiner, and each of the components $14_1 \ldots 14_K$ is a slicer which determines the closest estimated symbol to its input. The second, detector B, uses a linear combiner represented by a complex matrix followed by the real operators. In this case, reference 20 consists only of the linear combiner, and the decision devices consists of a real operator and slicer. Despite the similarities, the fact that the linear combiners for detectors A and B results in different performances and adaptive implementations. We now describe the two detector embodiments more thoroughly.

Figure 3:
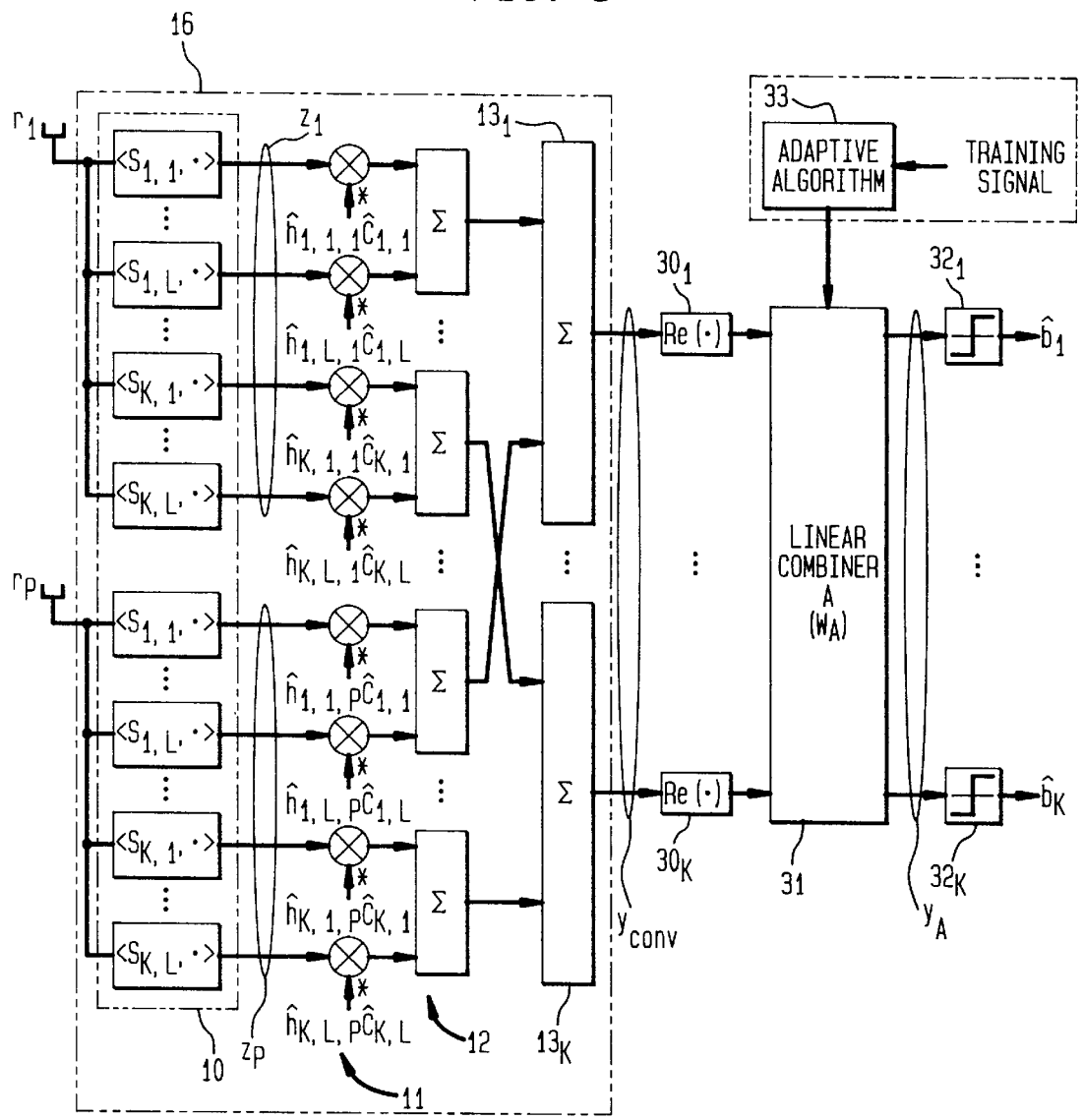
FIG. 3 shows a first embodiment (Detector A) of the multiuser space-time MMSE detector.

Space-Time Linear Multiuser Detector A (FIG. 3)

A set of sufficient statistics for the K users is given in equation (3) as the K-vector $Re\{y_{conv}\}$. The objective of the linear MMSE detector is to apply a K×K linear combiner to this vector such that the mean-squared error between its resulting vector and the data vector b is minimized. In other words, find the real K×K matrix $W_A$ such that $$W_A = \underset{w}{\mathrm{argmin}}\{E[\|W\mathrm{Re}\{y_{conv}\} - b\|^2]\}. \quad (5)$$

This detector in essence strikes the proper balance in combating both residual Gaussian noise, manifested through $n_{conv}$, and multiple access interference, manifested through the off-diagonal terms of $\mathrm{Re}\{\hat{C}^H[(\hat{H}^H H) \circ R]C\}$. It can be shown that the solution is:

$$W_A = E[b(\mathrm{Re}\{y^{conv}\})^H]\{E[\mathrm{Re}\{y^{conv}\}\mathrm{Re}^H\{y^{conv}\}]\}^{-1}$$

$$= AM(MA^2M^H + \sigma^2\hat{M})^{-1} \quad (6)$$

FIG. 3 shows a block diagram of detector-A in accordance with the invention. It contains P antennas and a bank of matched filters 10. The box 31 represents a linear combiner defined by the K-by-K matrix $W_A$ given by equation (6). The matrix can be put into words as follows: it is the product of 3 terms: (a) the diagonal amplitude matrix (A); (b) the equivalent array/channel/code correlation matrix (M); and the matrix inverse of the matrix $(MA^2M^H+\sigma^2\hat{M})$ which consists of the product of the array/channel/code correlation matrix (M), the square of the amplitude matrix ($A^2$), and the Hermitian conjugate of the array/channel/code correlation matrix ($M^H$) summed with the estimated array/channel/code correlation matrix ($\hat{M}$) which is weighted by the background noise variance ($\sigma^2$). This matrix minimizes the mean-squared error criterion given in equation (5), and because of the convexity of the mean-squared error expression in (5), the MMSE solution (6) represents a global minimum. A bank of decision slicers ($32_1$–$32_K$) follows the linear combiner.

An attractive feature of the MMSE detector is that it can be implemented adaptively using well-known adaptive algorithms (33) such as least-mean-squares or recursive least-squares. Using a training signal (for example, the user data bits), these techniques can be used to adaptively obtain $W_A$. Adaptive implementation is an option if direct calculation of $W_A$ is deemed too complex. Note that the adaptive implementation requires knowledge of the K users' spreading codes, multipath delays, and channel parameters.

Assuming that the array and channel estimates are exact $\hat{C}=C$; $\hat{H}=H$, we can rewrite the expression for $W_A$ in (6) as:

$$W_A = A^{-1}[\mathrm{Re}\{C^H[(H^H H)\circ R]C\} + \sigma^2 A^{-2}]^{-1},$$

and another attractive feature is that MMSE detector approaches the decorrelating (zero-forcing) detector (up to a scalar factor) as the residual Gaussian noise approaches zero:

$$\lim_{\sigma \to 0}(W_A) = A^{-1}(\mathrm{Re}\{C^H[(H^H H)\circ R]C\})^{-1}. \quad (7)$$

In other words, from (3) we have that:

$$\lim_{\sigma \to 0}(W_A y) = A^{-1}(\mathrm{Re}\{C^H[(H^H H)\circ R]C\})^{-1}\mathrm{Re}\{C^H[(H^H H)\circ R]C\}Ab$$

$$= b$$

and the multiple access interference is forced to be zero. In the implementation of the decorrelating detector A (DD-A), we replace $W_A$ given by equation (6) with $W_A = A^{-1}\mathrm{Re}^{-1}\{M\}$. We will assume that $C^H[(H^H H)\circ R]C$ is positive definite and hence invertible; and it follows that $\mathrm{Re}\{C^H[(H^H H)\circ R]C\}$ is also invertible.

Let us now calculate the bit error rate of this first MMSE detector (MMSE A). The K-vector at the slicer inputs is:

$$Y_A = W_A \mathrm{Re}\{y_{conv}\} = W_A MAb + n_A$$

where $$n_A \sim \eta(\kappa, \sigma^2 W_A \hat{M} W_A^H).$$

Hence the bit error rate for the kth user using the MMSE-A detector is:

$$P_k^{MMSE-A}(\sigma) = Q\left[\frac{(W_A MAb)_k}{\sigma\sqrt{(W_A \hat{M} W_A^H)_{(k,k)}}}\right]. \quad (8)$$

Letting $W_A = A^{-1}(\mathrm{Re}\{C^H[(H^H H)\circ R]C\})^{-1}$ and assuming perfect channel estimates, the bit error rate for DD-A, is:

$$P_k^{DD-A}(\sigma) = Q\left[\frac{A_k}{\sigma\sqrt{[(\mathrm{Re}\{C^H[(H^H H)\circ R]C\})^{-1}]_{(k,k)}}}\right] \quad (9)$$

One drawback of this MMSE detector is that the estimation of the channel and array coefficients cannot be incorporated into the adaptive algorithm for obtaining $W_A$. The estimates must be explicitly obtained using some other means (like a training or pilot signal). This leads us to ask, "is it possible to design an adaptive MMSE which does not require prior knowledge of the array and channel parameters?" The answer is a "yes," as we will see in the following section.

Figure 4:
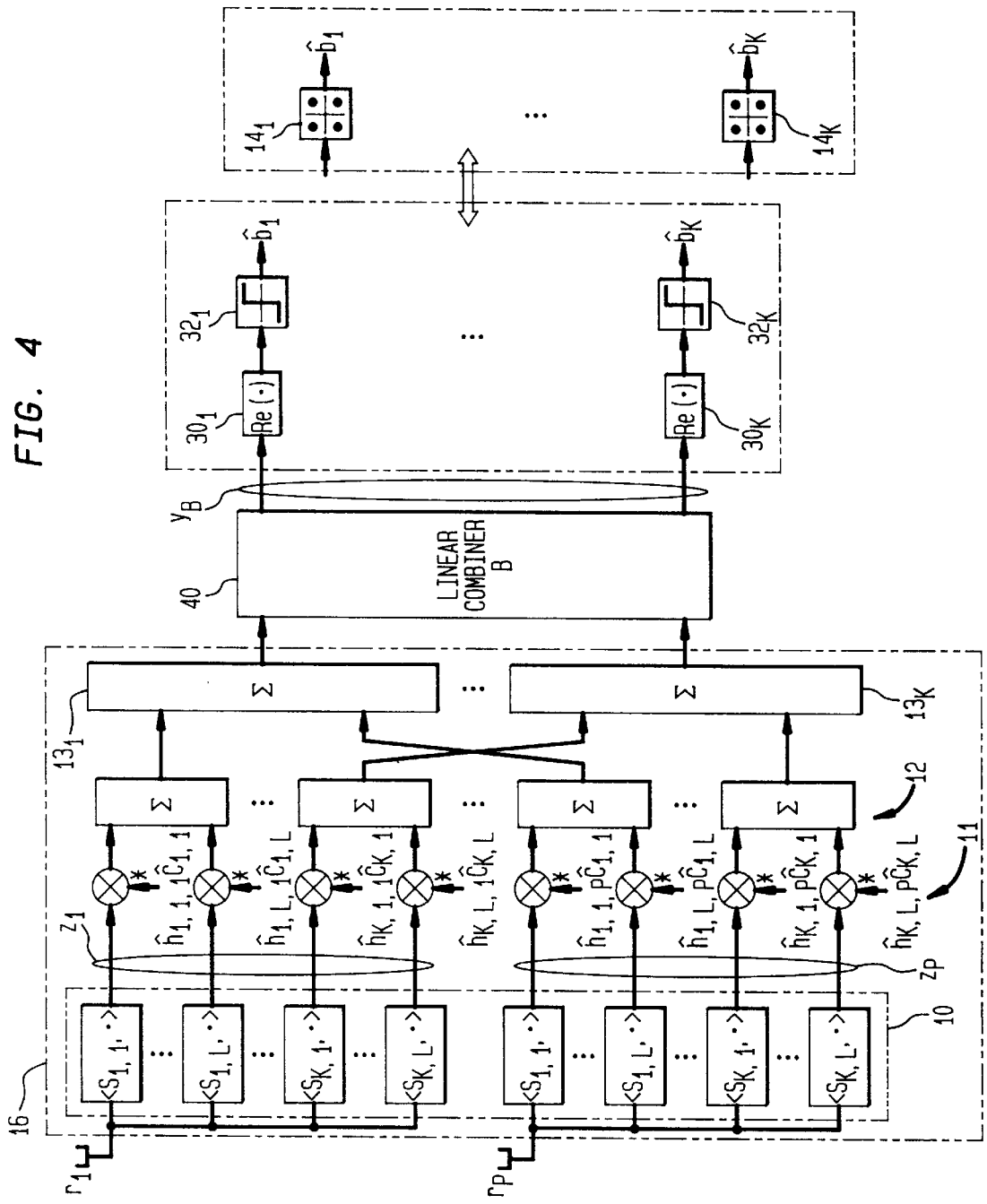
FIG. 4 shows a second embodiment (Detector B) of the multiuser space-time MMSE detector.

Space-Time Linear Multiuser Detector B (FIG. 4)

Figure 5:
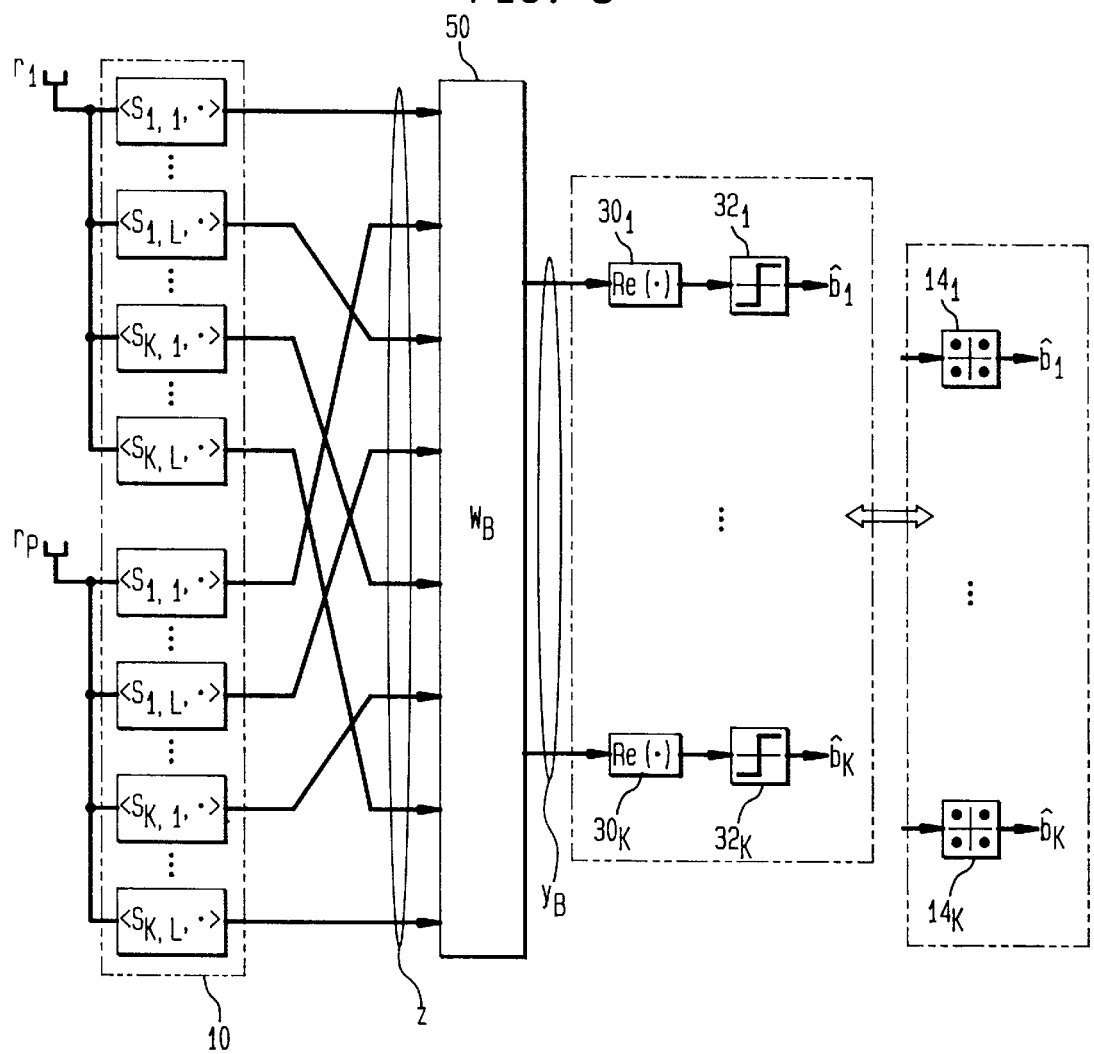
FIG. 5 shows an adaptive implementation of the second embodiment.

The goal of this subsection is to derive an MMSE detector which can be implemented adaptively and which does not require explicit array and channel estimates. (It will, however, still require timing estimates for the multipath delays.) FIG. 4 shows the basic structure of Detector B which exchanges the places of the real operators and linear combiner of Detector A. Following this exchange, the resulting cascade of the array combining, multipath combining, and linear combiner can be collected into a single complex K×KLP matrix multiplication called $W_B$, as shown in FIG. 5. Specifically, we define this matrix using the MMSE criterion as:

$$W_B = \underset{w}{\mathrm{argmin}}\{E[\|Wz - b\|^2]\},$$

and it follows from (4) that $$W_B = E(bz^H)[E(zz^H)]^{-1} \quad (10)$$

$$= AG^H\tilde{R}[\tilde{R}GA^2 G^H \tilde{R} + \sigma^2 \tilde{R}]^{-1}$$

$$= AG^H[\tilde{R}GA^2 G^H + \sigma^2 I_{KLP}]^{-1}$$

where $G = H^D C$ is the array/channel matrix. FIG. 5 shows a block diagram of the MMSE-B detector in accordance with the invention. It contains P antennas and a bank of matched filters 10. The box 50 represents a linear combiner defined by the K-by-KLP matrix $W_B$ given by equation (10). This matrix minimizes the mean-squared error criterion given above by $$W_B = \underset{w}{\mathrm{argmin}}\{E[\|Wz-b\|^2]\}.$$  (5)

The last line of equation (10) states that the matrix is the product of 3 terms: (a) the diagonal amplitude matrix (A); (b) the array/channel combiner matrix $H^D C$ which is equivalent to the array/channel combiner in the conventional detector but using the actual parameters and not their estimates; and (c) the matrix inverse of the matrix $\tilde{R}GA^2GH+\sigma^2 I_{KLP}$. The matrix inverse consists of the product of the correlation matrix ($\tilde{R}$) defined following equation (2), the array/channel combiner matrix G, the square of the amplitude matrix ($A^2$), and the Hermitian conjugate of the array/channel combiner matrix summed with the KLP-by-KLP identity matrix weighted by the background noise variance ($\sigma^2$). If the data is PAM., a bank of real operators ($30_1$–$30_K$) and decision slicers ($32_1$–$32_K$) follows the linear combiner. Otherwise, if the data is QAM, only the complex decision slicers ($14_1$–$14_K$) are required. For PAM data, Detectors A and B, while similar in structure, are not equivalent due to the different placement of the real operator.

To calculate the bit error rate of Detector B for BPSK data, the K-vector at the slicer inputs is $$\mathrm{Re}\{Y_B\}=\mathrm{Re}(W_B z)=\mathrm{Re}(W_B \tilde{R} H^D C) Ab + n_B$$

where $$n_B \sim \eta(0_K, \sigma^2 W_B \tilde{R} W_B^H).$$

Hence the bit error rate for the kth user using the MMSE-B detector is:

$$P_k^{MMSE-B}(\sigma) = Q\left[\frac{\{\mathrm{Re}(W_B \tilde{R} H^D C) Ab\}_k}{\sigma\sqrt{(W_B \tilde{R} W_B^H)_{(k,k)}}}\right].$$  (11)

Figure 6:
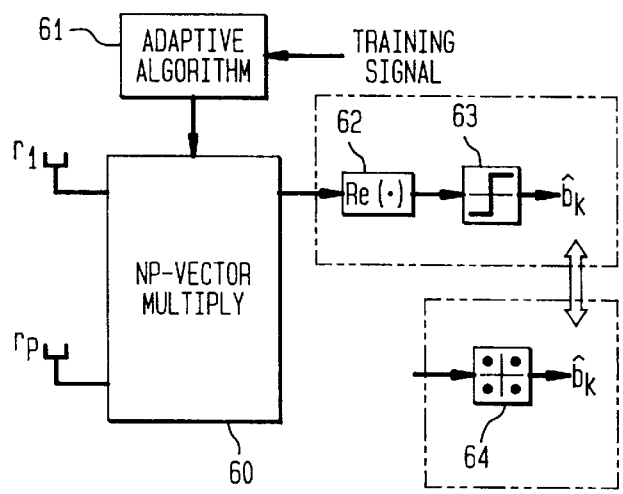
FIG. 6 shows interference cancellation located prior to the linear combiner of the first embodiment.

By concatenating the P received N-vectors into a single NP-vector $r=[r_1^T r_2^T \ldots r_P^T]^T$, we can combine the operations of the matched filter bank with the linear combiner $W_B$ to create a single K-by-NP matrix which multiplies r. As shown in FIG. 6, the detector structure for the kth user can be reduced to the kth row of this K-by-NP matrix 60 followed by the real operator 62 and decision slicer 63. Hence the MMSE-B detector can be implemented with a simple tap-weight filter architecture. Its corresponding decorrelating detector (described below), the MMSE-A detector and the DD-A detector can likewise be implemented with this architecture. Like the MMSE-A detector, this version of the MMSE-B detector can be implemented adaptively using well-known adaptive algorithms (61). However, MMSE-B has the advantage of not requiring the array and channel estimates. The tradeoff is that the adaptation may be slower because there are more taps to adjust.

While direct analytic comparisons between the two detectors is difficult, we will show that under perfect channel and array estimates, the performance of MMSE-A is uniformly superior to that of MMSE-B as the noise floor approaches zero. First, we show that the corresponding decorrelating detector for MMSE-B, DD-B, simply replaces $W_B$ with $A^{-1}[(H^D C)^H \tilde{R} H^D C]^{-1}(H^D C)^H$. (Recall that we have already made the assumption that $(H^D C)^H \tilde{R} H^D C = C^H[(H^H H) \circ R]C$ is invertible.)

PROPOSITION 1

$$\lim_{\sigma \to 0}\left[(A(H^D C))^H [\tilde{R} H^D (CA^2 (H^D C))^H + \sigma^2 I_{KLP}]^{-1}\right] =$$

$$A^{-1}[(H^D C)^H \tilde{R} H^D C]^{-1}(H^D C)^H$$

Proof: Multiplying both sides by $\tilde{R} H^D CA^2 (H^D C)^H + \sigma^2 I_{KLP}$ taking the limit as $\sigma$ approaches 0, we have that $$A(H^D C)^H = \lim_{\sigma \to 0} A^{-1}[(H^D C)^H \tilde{R} H^D C]^{-1} (H^D C)^H [\tilde{R} H^D C A^2 (H^D C)^H +$$

$$\sigma^2 I_{KLP}$$

$$= A(H^D C)^H + \lim_{\sigma \to 0}(\sigma^2 A^{-1}[(H^D C)^H \tilde{R} H^D C]^{-1}(H^D C)^H)$$

$$= A(H^D C)^H.$$

Hence, from the fact that $(H^D C)^H \tilde{R} H^D C = C^H[(H^H H) \circ R]C$ and the fact that the array and multipath combiners in MMSE-A can be represented by $(H^D D)^H$, the DD-B is the bank of matched filters, followed by the combiners, followed by the decorrelator $(C^H[(H^H H) \circ R]C)^{-1}$, followed by the real operators, and followed by the slicers. The DD-A is nearly identical except that the order of the decorrelator and the real operators are switched, and the decorrelator is $(\mathrm{Re}\{C^H[(H^H H) \circ R]C\})^{-1}$. By replacing $W_B$ with $U_B = A^{-1}[(H^D C)^H \tilde{R} H^D C]^{-1}(H^D C)^H$ in (11), the bit error rate of DD-B is:

$$P_k^{DD-B}(\sigma) = Q\left[\frac{A_k}{\sigma\sqrt{\mathrm{Re}[\{C^H[(H^H H) \circ R]C\}^{-1}]_{(k,k)}}}\right]$$  (12)

We would now like to show that DD-A has a uniformly lower bit error rate than DD-B.

PROPOSITION 2

$$P_k^{DD-A}(\sigma) \leq P_k^{DD-B}(\sigma)$$

Define $\overline{M} \equiv C^H[(H^H H) \circ R]C$, which is Hermitian and assumed to be positive definite. It follows that $[\mathrm{Re}(\overline{M})]^{-1}$, is also positive definite, and it is sufficient to show that the kth diagonal element of $[\mathrm{Re}(\overline{M})]^{-1}$ is greater than or equal to the kth diagonal element of $\overline{M}^{-1}$. $\overline{M}^{-1}$. (Note that since $\overline{M}$ is Hermitian, its inverse is also Hermitian, hence the diagonal elements of the inverse are real.) Chose y to be real and set $x=[\mathrm{Re}(\overline{M})]^{-1}y$, and note that x is real. Thus $x^{T \overline{M} x=x^T}$ $\mathrm{Re}(\overline{M})x=y[\mathrm{Re}(\overline{M})]^{-1}y$ and also $x^T y=y^T[\mathrm{Re}(\overline{M})]^{-1}y$. Using a generalization of Bergstrom's inequality which states that for any real x, real y, and positive definite $\overline{M}$, $x^T \overline{M} Xxy^T (\overline{M})^{-1}y \geq (x^T y)^2$ we have that $$y^T[\mathrm{Re}(\overline{M})]^{-1}yy^T(\overline{M})^{-1}y \geq (y^T[\mathrm{Re}(\overline{M})]^{-1}y)^2 y^T(\overline{M})^{-1}y \geq y^T[\mathrm{Re}(\overline{M})]^{-1}y,$$

and the result follows by using the kth unit vector for y. Despite this relationship, it turns out that the performance of DD-A and DD-B are actually quite similar. More importantly, it has been shown that the performance of MMSE-B can be better than MMSE-A for the practical case of inexact array and channel estimates.

Extensions of MMSE Detectors to the Asynchronous Multirate Case

So far, we have assumed bit synchronous operation of these linear multiuser detectors. We now show how their operation can be extended to the bit asynchronous case. First, we consider the operation of a decorrelating detector in a synchronous single-rate environment. Similar reasoning applies to MMSE detectors; however, for pedagogical purposes, we focus on the decorrelating detector. Suppose that there are two users with respective spreading codes $s_1(t)$ and $s_2(t)$. Table A below shows the relationship between the two codes in time, with the thin vertical lines representing symbol boundaries. The received signal is $r(t)=A_1 s_1(t) b_1 + A_2 s_2(t) b_2 + n(t)$ where $A_k$ is the kth user's amplitude, $b_k$ is the kth user's data bit, and $n(t)$ is the additive Gaussian noise.

TABLE A 2 user synchronous single-rate system

| ... | $s_1(t)$ | ... |
| ... | $s_2(t)$ | ... |

TABLE B 2 user asynchronous single-rate system

| ... | $s_1(t)$ | | ... |
| ... | $s_2(t)$ | $s_2(t-T)$ | ... |

TABLE C 2 user synchronous multi-rate system

| ... | $s_1(t)$ | | | ... |
| ... | $s_2(t)$ | $s_2(t-T)$ | $s_2(t-2T)$ | ... |

If user 1 is the desired user, its decorrelating detector for a given symbol interval is the matched filter for code $s_1(t)$ projected into the null-space of $s_2(t)$. For the asynchronous single-rate case, shown in Table—B, the decorrelating detector for user 1 is projected into the null-space spanned by the linear combinations of user 2's codes which overlap during that symbol interval. If we let $s_2^R(t)$ be the portion of $s_2(t)$ which overlaps with $s_1(t)$ and let $s_2^L(t-T)$ be the portion of $s_2(t-T)$ which overlaps with $s_1(t)$, then, assuming BPSK data modulation, the null space is spanned by $s_2^R(t)+s_2^L(t-T)$ and $s_2^R(t)-s_2^L(t-T)$. This idea can be extended to the asynchronous multi-rate case shown in Table—C. Using similar function definitions, the decorrelator for user 1 lies in the null space spanned by $s_2^R(t)+s_2(t-T)+s_2^L(t-2T)$, $s_2^R(t)+s_2(t-T)-s_2^L(t-2T)$, $s_2^R(t)-s_2(t-T)+s_2^L(t-2T)$, and $s_2^R(t)-s_2(t-T)-s_2^L(t-2T)$. As the disparity between data rates increases, the effectiveness of a linear multiuser detector decreases since it will be constrained to a more restrictive subspace. The reasoning above can be applied to MMSE detectors by similarly combining the appropriate subspaces of the interfering waveforms.

MMSE Detectors and Interference Cancellation

The MMSE techniques described here can be used in conjunction with a non-linear multiuser detection technique known as interference cancellation. Whereas the linear multiuser detectors rely on subspace projections to mitigate interference, the interference cancellers directly subtract off the interference. Two types of interference cancellation can be used: pre-combiner, where the cancellation occurs before the linear combiner, and post-combiner, where it occurs after. Pre-combiner cancellation is used for canceling interference which is not accounted for by the linear combiner. For example, we may choose to cancel a high-powered, high-data rate signal from within the cell instead of accounting for it with the linear combiner. Post-combiner cancellation on the other hand is used for refining the symbol estimates made by the linear combiner. Using preliminary symbol estimates from the linear multiuser detector, the signals are reconstructed and subtracted from the received signals to form enhanced signals which are used for a second stage of symbol estimation. In both interference cancellation techniques, capacity can be potentially increased by suppressing the interference.

Figure 7:
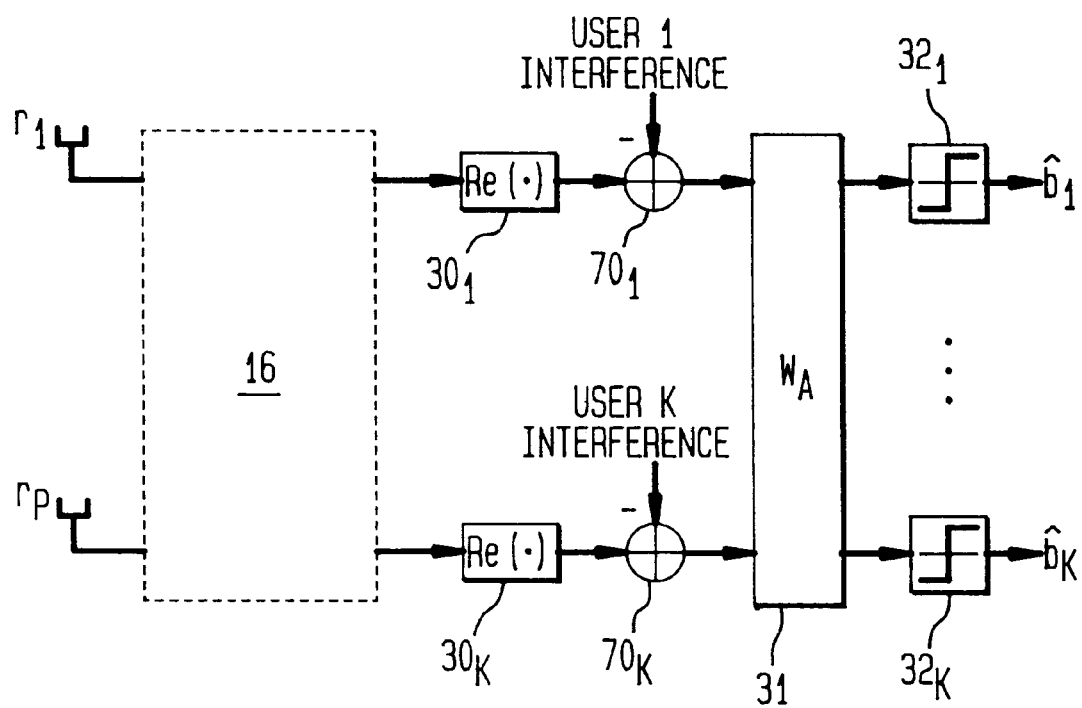
FIG. 7 shows interference cancellation located prior to the linear combiner of the second embodiment.

FIG. 7 shows a block diagram of a pre-combiner interference canceller in accordance with Detector A shown in FIG. 3. At the kth input to the linear combiner $W_A$, there is interference due to users $j=1 \ldots K$, $j \neq k$, which will be accounted for with $W_A$. However, there may also be otherwise unaccounted interference, for example, high-powered interference from within the cell. This interference could be subtracted from the input to $W_A$ if the spreading codes, multipath delays, data bits, and channel parameters at all antennas are known. In this case, the baseband signal for the interference could be reconstructed and its contribution to the kth input of $W_A$ could be estimated (by passing the reconstructed signal through the processing chain for user k) and subtracted at the point designated $70_k(k=1 \ldots K)$. Contributions from other interference for this or other inputs can be similarly computed and subtracted.

Figure 8:
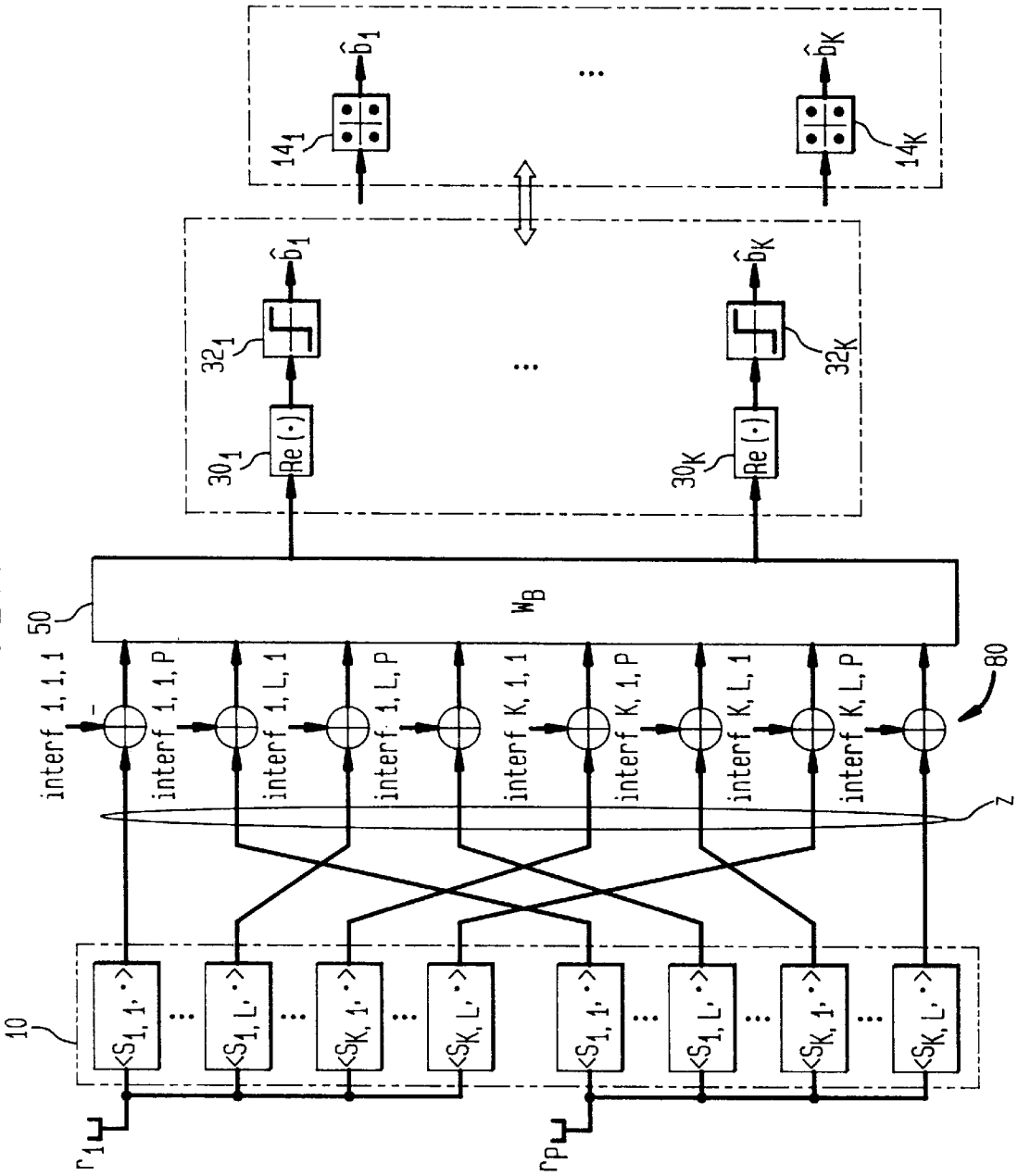
FIG. 8 shows interference cancellation following the linear combiner of the multiuser space-time MMSE detector in accordance with the invention.

FIG. 8 shows a block diagram of a pre-combiner interference canceller in accordance with Detector B from FIG. 4. Using the same method as described above for the Detector A pre-combiner interference canceller, the interference which is not accounted for by $W_B$ can be subtracted from each of its inputs at the point designated 80.

Figure 9:
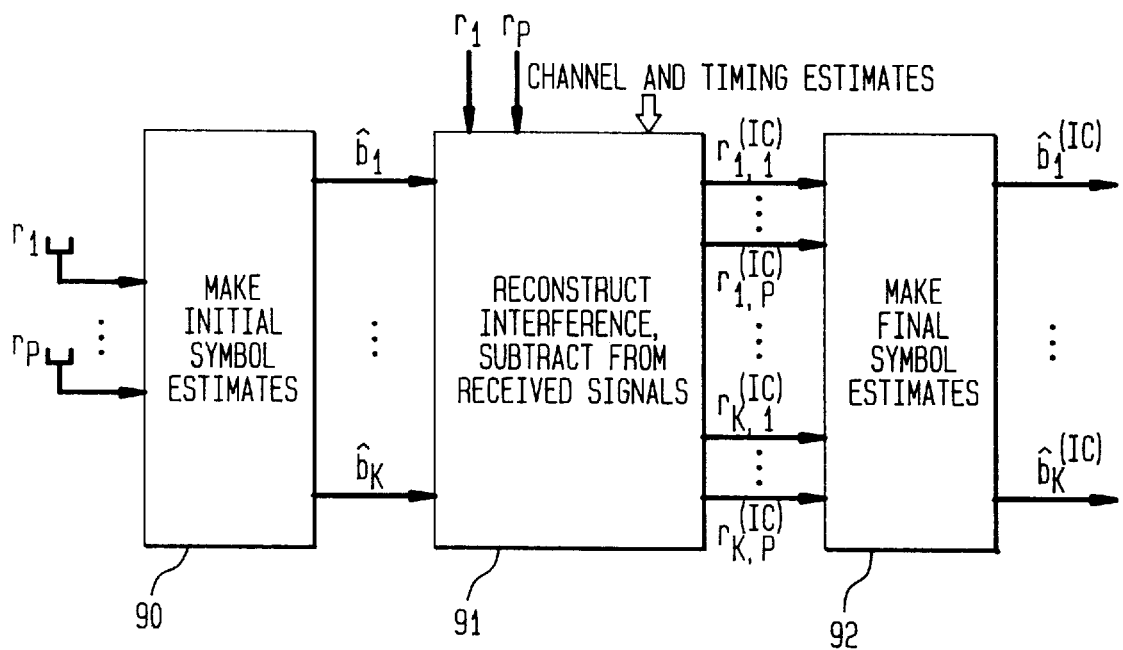
FIG. 9 shows a block diagram of a post-combiner interference cancellation receiver in accordance with the invention.

FIG. 9 shows a block diagram of a post-combiner interference cancellation receiver in accordance with the invention. This receiver includes P antennas and has three stages, designated 90, 91 and 92. The first stage 90 receives baseband signals $r_p$ and makes preliminary symbol estimates for all K users with either a MMSE-A detector of FIG. 1 or a MMSE-B detector of FIG. 2. The second stage 91 uses the preliminary symbol estimates from the first stage 90 and knowledge of the K users' spreading codes, delays, and channel parameters to reconstruct the baseband received signals for each of the users. The second stage 91 subtracts the multiaccess interference with respect to a desired user k from the received signals $r_1 \ldots r_P$ to form the following enhanced received signals for user k:

$$r_{k,p}^{(IC)} \equiv r_p - \sum_{j=1, j \neq k}^{K} \sum_{l=1}^{L} A_j \hat{h}_{j,l,p} \hat{c}_{j,l} s_{j,l} \hat{b}_j \quad p=1, \ldots, P$$

Note that the multipath interference with respect to user k can also be removed. We will not describe this option in detail because its relative gains will generally be negligible unless the number of users K is very small. Ideally, if the preliminary symbol estimates and the channel estimates are perfect, there will be no multiaccess interference in the enhanced received signals. However, this will generally not be the case in practice. In the third stage 82, the enhance received signals are processed with a conventional space-time receiver shown in FIG. 1 to generate the final symbol estimates $\hat{b}_k^{(1C)}$ for the K users.

The post-combiner interference cancellation procedure described above can be continued for multiple iterations by repeating stages 91 and 92 indefinitely. Performance gains due to repeated iterations diminish after the first two or three iterations. To reduce the complexity, interference cancellation of both types can be performed on a subset of users.

What has been described is deemed to be illustrative of the principles of the invention. In particular, it should be noted that the apparatus and methods of the invention may be implemented through various technologies, for example, through the use of large scale integrated circuitry, application specific integrated circuits and/or stored program general purpose or special purpose computers or microprocessors, including a single processor such as a digital signal processor (DSP), using any of a variety of computer-readable media. Further and other embodiments will be apparent to those skilled in the art without, however, departing from the spirit and scope of the invention.

What is claimed is:

1. A method for detecting the data signals modulated respectively by multiple direct-sequence spread spectrum signals from K users, each signal being received through L resolvable multipath components with P receiver antennas, comprising the steps of:
   a) generating matched filter outputs for at least a subset of the multiple signals, a plurality of the multipath components of these signals, and said P plurality of receiver antennas;
   b) developing coherent channel estimates from said matched filter outputs;
   c) weighting and combining the matched filter outputs using the coherent channel estimates;
   d) employing a linear combiner which is a function of a correlation matrix derived from said K users' signals and coefficients corresponding to said L resolvable multipath components and said P receiver antennas for estimating the respective data symbols for at least a subset of the spread spectrum signals while suppressing multiple access interference, and
   e) passing each component of the final K-vector output of the linear combiner to a decision slicer for further processing.

2. The method of claim 1 wherein said coherent channel estimates are developed from said matched filter outputs.

3. The method of claim 1 wherein said coherent channel estimates are developed from an auxiliary signal.

4. A receiver comprising:
   a bank of correlators for despreading K code-spread data signals $s_1, s_2, \ldots, s_K$ bearing respective data $b_1, b_2, \ldots, b_K$ each with at most L resolvable multipath components to form a K-vector;
   means for applying a linear combiner to the K-vector to suppress multiple access interference; said linear combiner forming the product of:
      the diagonal amplitude matrix (A);
      the hermitian transpose of the array/channel matrix ($G^H$); and
      the matrix inverse of the matrix ($\tilde{R}GA^2G^H + \sigma^2 I_{KLP}$), where $\tilde{R}$ is the complex block-Toeplitz correlation matrix, $\sigma^2$ is the background noise variance, and $I_{KLP}$ is the identity matrix whose dimension is KLP×KLP, and means for processing the output of the linear combiner to produce estimates of the respective data symbols.

5. A method of demodulating K direct sequence code-spread data signals subjected to L-path frequency-selective fading, received at an array of P antennas comprising:
   despreading with a bank of filters matched to L multipath delayed replicas of each of the K signals received at each of the P antennas;
   weighting the despread signals with the complex conjugate of an estimate of the array/channel coefficient;
   summing together the weighted, despread signals to form a K-vector;
   applying a linear transform to the K-vector to suppress multiple access interference, said linear transform being the product of:
      the diagonal amplitude matrix (A);
      the equivalent array/channel/code correlation matrix (M); and
      the matrix inverse of the matrix ($MA^2M^H + \sigma^2 \hat{M}$) where $M^H$ is the hermitian conjugate of the array/channel/code correlation matrix, ($\hat{M}$), is the estimated array/channel/code correlation matrix and $\sigma^2$ is the background noise variance; and
   processing the resulting signals to produce estimates of the respective data symbols.

6. The method of claim 1 wherein the linear combiner employs a minimum mean-squared error criterion.

7. The method of claim 6 wherein said minimum mean-squared error criterion designates a linear combiner for the kth user which minimizes the expected squared error between the combiner output and the kth user data symbol.

8. The method of claim 1 wherein the linear combiner comprises a matrix $W_B$ formed from the product of (a) the diagonal amplitude matrix A; (b) an array/channel/combiner matrix which uses actual parameters rather than estimates of the parameters; and (c) the matrix inverse of the product of (i) the correlation matrix $\tilde{R}$; (ii) the array channel combiner matrix G; (iii) the square of the amplitude matrix ($A^2$) and the Hermitian conjugate of the array/channel combiner matrix ($M^H$) summed with the KLP-by-KLP identity matrix weighted by the background noise variance $\sigma^2$, where L are the time resolvable multipath components of the signals.

9. The method of claim 1 wherein the linear combiner comprises a matrix $W_B$ formed from the product of (a) the diagonal amplitude matrix A; (b) an array/channel/combiner matrix which uses estimates of the parameters; and (c) the matrix inverse of the product of (i) the correlation matrix $\tilde{R}$; (ii) the array channel combiner matrix G; (iii) the square of the amplitude matrix ($A^2$) and the Hermitian conjugate of the array/channel combiner matrix ($M^H$) summed with the KLP-by-KLP identity matrix weighted by the background noise variance $\sigma^2$, where L are the time resolvable multipath components of the signals.

10. The method of claim 1 wherein the linear combiner employs a zero-forcing error criterion.

11. The method of claim 8 wherein the linear combiner forms a matrix $W_B$ from the complex block-Toeplitz correlation matrix $\tilde{R}$, the complex array/channel matrix G, and the diagonal amplitude matrix A.

12. The method of claim 8 wherein the linear combiner forms a matrix $W_B$ from the complex block-Toeplitz correlation matrix $\tilde{R}$, an estimate of the complex array/channel matrix $\tilde{G}$, and the diagonal amplitude matrix A.

13. The method of claim 1 wherein the data signals are pulse amplitude modulated, and the real components of each of the combined matched filter outputs are extracted prior to the linear combiner.

14. The method of claim 11 wherein the linear combiner employs a minimum mean-squared error criterion.

15. The method of claim 12 wherein the minimum mean-squared error criterion designates a linear combiner for the kth user which minimizes the expected squared error between the combiner output and the kth user data symbol.

16. The method of claim 1 wherein said linear combiner comprises a matrix $W_A$ formed from the product of (a) the diagonal amplitude matrix A; (b) equivalent array/channel/code correlation matrix (M); and
   (c) the matrix inverse of the product of (i) the array/channel/code correlation matrix (M); (ii) the square of the amplitude matrix ($A^2$) and (iii) the Hermitian conjugate of the array/channel/code correlation matrix ($M^H$) summed with the estimated array/channel/code correlation matrix ($\hat{M}$) weighted with the background noise variance $\sigma^2$.

17. The method of claim 1 wherein said linear combiner comprises a matrix $W_A$ formed from the product of (a) the diagonal amplitude matrix A, (b) an estimate of the equivalent array/channel/code correlation matrix ($\hat{M}$; and (c) the matrix inverse of the product of (i) the estimated array/channel/code correlation matrix ($\hat{M}$), (ii) the square of the amplitude matrix ($A^2$) and (iii) the Hermitian conjugate of the array/channel/code correlation matrix ($M^H$) summed with the estimated array/channel/code correlation matrix ($\hat{M}$) weighted with background noise variance $\sigma^2$.

18. The method of claim 11 wherein the linear combiner employs a zero-forcing error criterion.

19. The method of claim 16 wherein the linear combiner zero-forcing criterion includes forming a matrix $W_A$ from matrix inverse of the real equivalent array/channel/code correlation matrix Re(M).

20. The method of claim 16 wherein the linear combiner zero-forcing criterion includes forming a matrix $W_A$ from the matrix inverse of the real part of an estimate of the equivalent array/channel/code correlation matrix Re($\hat{M}$).

21. A receiver comprising:
   a) space-time rake receiver having:
      i) a bank of correlators for resolving K code-spread data signals $s_1, s_2, \ldots, s_K$ bearing respective data $b_1, b_2, \ldots, b_K$ each with at most L resolvable multipath components with complex amplitude $c_{k,l}$ (k=1,2,...,K; l=1,2,...,L), arriving at a P element antenna array with complex amplitude $h_{k,l,p}$ (1,2,...,P) into at most KLP correlator outputs corresponding to at most L multipath signals for each of the K users at each of the P antenna array elements;
      ii) means for weighting the output of each correlator according to the complex conjugate of an estimate of the coefficient for a respective channel and path ($\hat{h}^*_{k,l,p}\hat{c}^*_{k,l}$);
      iii) means for summing together the weighted resulting LP complex values for each user; and
      iv) means for forming a K-vector of the K resulting summations;
   b) means for applying a linear combiner to the K-vector to suppress multiple access interference; and
   c) means for processing the resulting signals to produce estimates of the respective data symbols.

22. A receiver according to claim 21 wherein said means for the linear combiner comprises means for forming the product of:
   the diagonal amplitude matrix (A);
   the equivalent array/channel/code correlation matrix (M); and
   the matrix inverse of the matrix ($MA^2M^H + \sigma^2\hat{M}$), where $M^H$ is the hermitian conjugate of the array/channel/code correlation matrix, ($\hat{M}$) is the estimated array/channel/code correlation matrix and ($\sigma^2$) is the background noise variance.

23. A receiver according to claim 21 wherein the real parts of the K resulting summations are extracted prior to the linear combiner.

24. Apparatus for use in detecting at a receiver in a wireless system with multiple transmitted direct-sequence spread spectrum signals from K users, each signal being received through L resolvable multipath components with P receiver antennas, comprising:
   a) a matched filter providing a plurality of outputs for at least a subset of the multiple signals, a plurality of the multipath components of these signals, and a plurality of receiver antennas;
   b) means for developing coherent channel estimates from the matched filter outputs;
   c) means for weighting and combining the matched filter outputs using the coherent channel estimates; and
   e) a linear combiner which is a function of a correlation matrix derived from said K users' signals and coefficients corresponding to said L resolvable multipath components and said P receiver antennas for estimating the respective data signals for at least a subset of the spread spectrum signals while suppressing multiple access interference.

* * * * *